United States Patent
Itoh

(10) Patent No.: US 7,075,733 B2
(45) Date of Patent: Jul. 11, 2006

(54) ZOOM LENS SYSTEM AND IMAGE PICKUP APPARATUS INCLUDING THE SAME

(75) Inventor: Yoshinori Itoh, Tochigi-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/154,042

(22) Filed: Jun. 15, 2005

(65) Prior Publication Data

US 2005/0280902 A1 Dec. 22, 2005

(30) Foreign Application Priority Data

Jun. 16, 2004 (JP) ............................ 2004-178533

(51) Int. Cl.
G02B 15/14 (2006.01)
(52) U.S. Cl. ................... 359/689; 359/683; 359/680; 359/681; 359/682; 359/716; 359/740; 359/753; 359/784; 359/781
(58) Field of Classification Search ................ 359/683, 359/689, 680–682, 716, 740, 753, 784, 781
See application file for complete search history.

(56) References Cited

U.S. PATENT DOCUMENTS

| 4,662,723 | A | 5/1987 | Imai |
| 4,733,952 | A | 3/1988 | Fujioka |
| 5,434,710 | A | 7/1995 | Zozawa |
| 5,663,836 | A | 9/1997 | Ogata |
| 5,872,660 | A | 2/1999 | Kohno et al. |
| 6,025,961 | A | 2/2000 | Kohno et al. |
| 6,191,896 | B1 | 2/2001 | Itoh |
| 6,233,099 | B1 | 5/2001 | Itoh |
| 6,646,815 | B1 * | 11/2003 | Nobe ........................ 359/689 |
| 6,671,103 | B1 * | 12/2003 | Itoh ........................ 359/689 |
| 6,710,934 | B1 * | 3/2004 | Park ........................ 359/689 |
| 6,735,020 | B1 * | 5/2004 | Sekita ........................ 359/682 |
| 6,919,994 | B1 * | 7/2005 | Tanaka ........................ 359/689 |
| 6,943,962 | B1 * | 9/2005 | Sekita ........................ 359/689 |

FOREIGN PATENT DOCUMENTS

| JP | 6-66008 B2 | 8/1994 |
| JP | 7-52256 B2 | 6/1995 |
| JP | 10-104520 A | 4/1998 |
| JP | 11-84242 A | 3/1999 |
| JP | 11-84243 A | 3/1999 |
| JP | 11-84243 A5 | 3/1999 |
| JP | 2001-147370 A | 5/2001 |

* cited by examiner

Primary Examiner—Evelyn A. Lester
(74) Attorney, Agent, or Firm—Morgan & Finnegan, L.L.P.

(57) ABSTRACT

A zoom lens system in which reductions in the number of lenses and entire lens length are realized is provided. The zoom lens system includes, in order from an object side to an image side, a first lens unit having negative optical power, a second lens unit having positive optical power, and a third lens unit having positive optical power. During zooming from a wide-angle end to a telephoto end, an interval between the first lens unit and the second lens unit reduces and an interval between the second lens unit and the third lens unit changes. An aspherical lens is used for a positive lens element of the first lens unit. Shapes of respective lens elements composing the first lens unit, an interval therebetween, and the like are suitably set.

14 Claims, 7 Drawing Sheets

ZOOM LENS SYSTEM AND IMAGE PICKUP APPARATUS INCLUDING THE SAME

BACKGROUND OF THE INVENTION

1. Field of the Invention

The present invention relates to a zoom lens system, and more particularly to a zoom lens system suitable for use in a photographing optical system for a digital still camera using a solid image pickup element such as a CCD.

2. Related Background Art

In recent years, attention has been given to a so-called digital still camera for photographing a still image using a solid-state image pickup element such as a CCD. In order to reduce an entire size of the camera, an optical system having an extremely short entire lens length has been required for a zoom lens serving as a photographing optical system of the digital still camera.

In view of a characteristic of the still image, it is desirable that the digital still camera have a wide field angle. Also, the digital still camera is required to have higher optical performance than that of a video camera for moving picture photographing.

According to, for example, Examined Japanese Patent Application Publication No. H06-066008 (corresponding to U.S. Pat. No. 4,662,723), a zoom lens has been proposed as a zoom lens of a type in which a zoom ratio is about 2.5 to 3, a wide-angle range is ensured, an intensity is high, and high performance is obtained. This zoom lens includes two lens units, that is, a lens unit having a negative refractive power and a lens unit having a positive refractive power. Zooming is performed by changing an interval between the respective lens units.

According to, for example, Examined Japanese Patent Application Publication No. H07-052256 (corresponding to U.S. Pat. No. 4,733,952), there is an example of a zoom lens including three lens units, that is, a first lens unit having a negative refractive power, a second lens unit having a positive refractive power, and a third lens unit having a positive refractive power. An interval between the second lens unit and the third lens unit is changed during zooming from a wide-angle end to a telephoto end.

According to U.S. Pat. No. 5,434,710, there is an example of a zoom lens which includes three lens units, that is, a first lens unit having a negative refractive power, a second lens unit having a positive refractive power, and a third lens unit having a positive refractive power and in which an interval between the second lens unit and the third lens unit reduces during zooming from the wide-angle end to the telephoto end.

According to Japanese Patent Application Laid-Open No. H10-104520, there is an example of a zoom lens of a super wide-angle type which includes four lens units, that is, a lens unit having a negative refractive power, a lens unit having a positive refractive power, a lens unit having a positive refractive power, and a lens unit having a positive refractive power.

According to Japanese Patent Application Laid-Open No. H11-084242 (corresponding to U.S. Pat. No. 6,191,896), there has been proposed a zoom lens of a zoom type which includes four lens units, that is, a lens unit having a negative refractive power, a lens unit having a positive refractive power, a lens unit having a positive refractive power, and a lens unit having a positive refractive power. The zoom lens is compact and has a zoom ratio of about 3. A variation in exit pupil position during zooming is relatively small.

In the case of a zoom lens of a conventional type in which a lens unit having a negative refractive power precedes other lens units, a first lens unit is generally composed of three or more lenses. In order to obtain a compact structure, there have been proposed various zoom lenses, in each of which the first lens unit is composed of two lenses (negative lens and positive lens) in which an aspherical surface is provided for the negative lens.

Examples in which the first lens unit is composed of two lenses (negative lens and positive lens) and an aspherical lens is used for the positive lens are disclosed in Japanese Patent Application Laid-Open No. H11-084243 (corresponding to U.S. Pat. No. 6,233,099), Japanese Patent Application Laid-Open No. 2001-147370, U.S. Pat. No. 5,663,836, U.S. Pat. No. 5,872,660, and U.S. Pat. No. 6,025,961.

The two-unit zoom lens as disclosed in Examined Japanese Patent Application Publication No. H06-066008 includes a large number of lenses and is insufficient in view of compactness. A variation in exit pupil position during zooming is large. Though there is no problem when the zoom lens is used for silver-halide film camera, when the zoom lens is used for a digital still camera including a solid-state image pickup element, design power allocation is restricted, so a size of the zoom lens is likely to increase.

As in the two-unit zoom lens described in Examined Japanese Patent Application Publication No. H06-066008, even in the zoom lens described in Examined Japanese Patent Application Publication No. H07-052256, a variation in exit pupil position during zooming is large. Therefore, the zoom lens described in Examined Japanese Patent Application Publication No. H07-052256 is inappropriate for a photographing optical system for digital still camera.

The zoom lens disclosed in U.S. Pat. No. 5,434,710 includes a large number of lenses, so there is a limitation to reduce a size thereof.

With respect to the zoom lens disclosed in Japanese Patent Application Laid-Open No. H10-104520, although only a zoom ratio of about 2.4 is obtained, the number of constituent lenses is large. In addition, the lens arrangement is made to realize the super wide angle, so sufficient compactness is not obtained.

The zoom lens disclosed in Japanese Patent Application Laid-Open No. H11-084242 puts a priority on a reduction in size thereof, so the number of constituent lenses is very small. Therefore, the zoom lens is suitable for use in a low-cost digital still camera having a small number of pixels. However, high performance suitable for a digital still camera having a high pixel density is not obtained.

An uneven thickness ratio between a central portion and a peripheral portion of the negative lens in the first lens unit is large. Therefore, when an aspherical lens is used as the negative lens, there is a problem in that a manufacturing cost increases.

SUMMARY OF THE INVENTION

The present invention has been made in view of the problems with respect to a zoom lens of a conventional type in which a lens unit having a negative refractive power precedes other lens units. An object of the present invention is to provide a zoom lens system capable of obtaining a desirable zoom ratio and desirable optical performance while having a structure in which reductions in the number of lenses and entire lens length are realized.

An illustrated zoom lens system of the present invention includes, in order from an object side to an image side, a first lens unit having negative optical power (reciprocal of focal length), a second lens unit having positive optical power, and a third lens unit having positive optical power. During zooming from a wide-angle end to a telephoto end, an interval between the first lens unit and the second lens unit reduces and an interval between the second lens unit and the third lens unit changes. The first lens unit of the zoom lens system consists of a first lens element having negative optical power and a second lens element having positive optical power. The second lens element is an aspherical lens. The first lens unit satisfies the following conditions, $$0.1 < r2/r3 < 0.35,$$

$$-2.0 < (r3+r4)/(r3-r4) < 0.5,$$

$$0.38 < d2/d1t < 0.55,$$

where r2 represents a curvature radius of an image side surface of the first lens element, r3 represents a curvature radius of an object side surface of the second lens element, r4 represents a curvature radius of an image side surface of the second lens element, d2 represents an interval between the first lens element and the second lens element, and d1t represents an optical axial thickness of the first lens unit.

Another illustrated zoom lens system of the present invention includes, in order from an object side to an image side, a first lens unit having negative optical power, a second lens unit having positive optical power, and a third lens unit having positive optical power. During zooming from a wide-angle end to a telephoto end, an interval between the first lens unit and the second lens unit reduces and an interval between the second lens unit and the third lens unit changes. In the zoom lens system, the first lens unit consists of a first lens element having negative optical power and a second lens element having positive optical power. The second lens element is an aspherical lens. The second lens unit consists, in order from the object side to the image side, of a third lens element having positive optical power, a fourth lens element having negative optical power, a fifth lens element having negative optical power, and a sixth lens element having positive optical power. The third lens element and the fourth lens element compose a cemented lens. The fifth lens element and the sixth lens element compose a cemented lens.

DETAILED DESCRIPTION OF THE PREFERRED EMBODIMENTS

Hereinafter, a zoom lens system according to each of embodiments of the present invention will be described with reference to the drawings.

Figure 1:
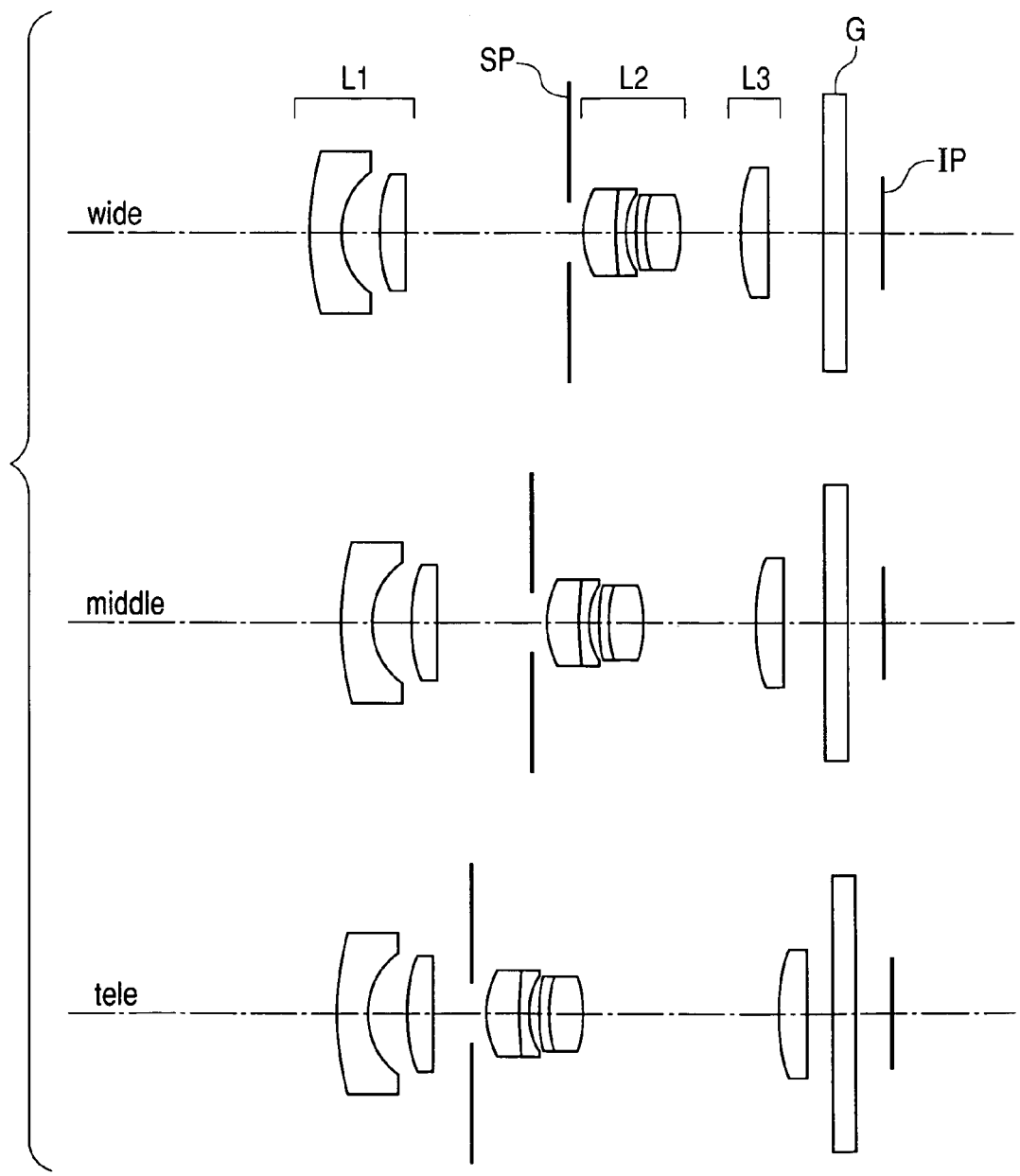
FIG. 1 is a lens sectional view showing a zoom lens according to Embodiment 1 of the present invention.
Figure 2A:
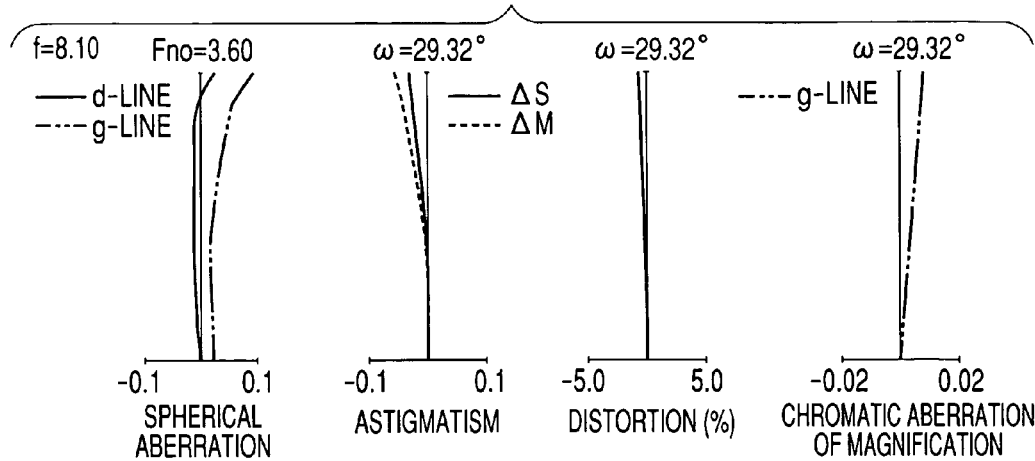
FIGS. 2A, 2B, and 2C are graphs showing various aberrations of the zoom lens according to Embodiment 1 of the present invention.
Figure 2B:
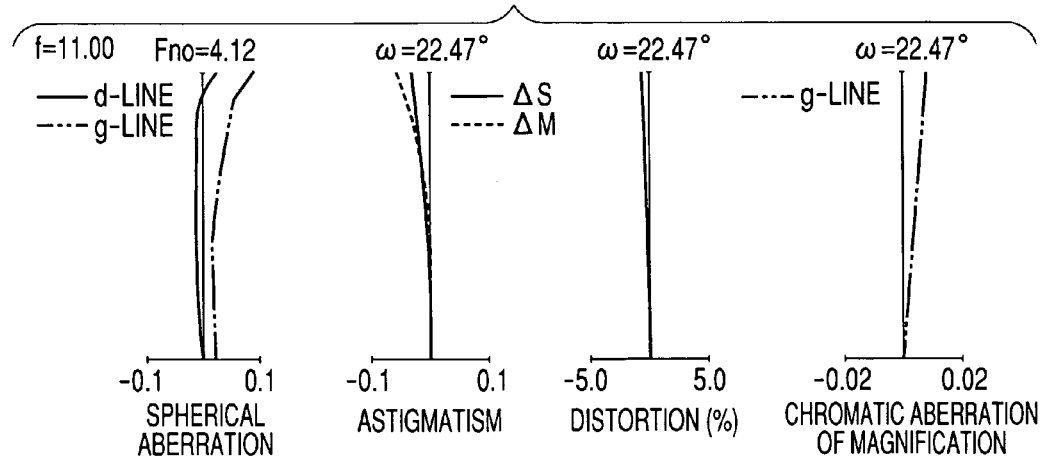
Figure 2C:
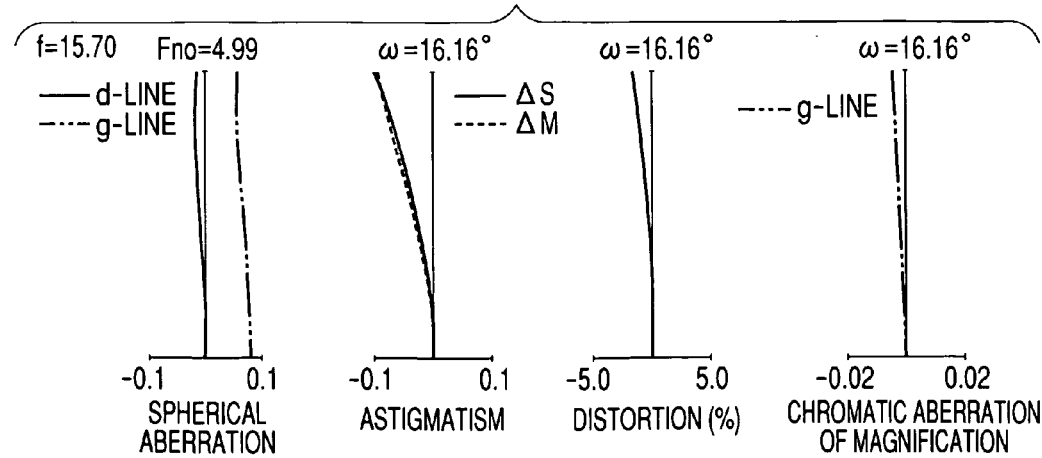
Figure 3:
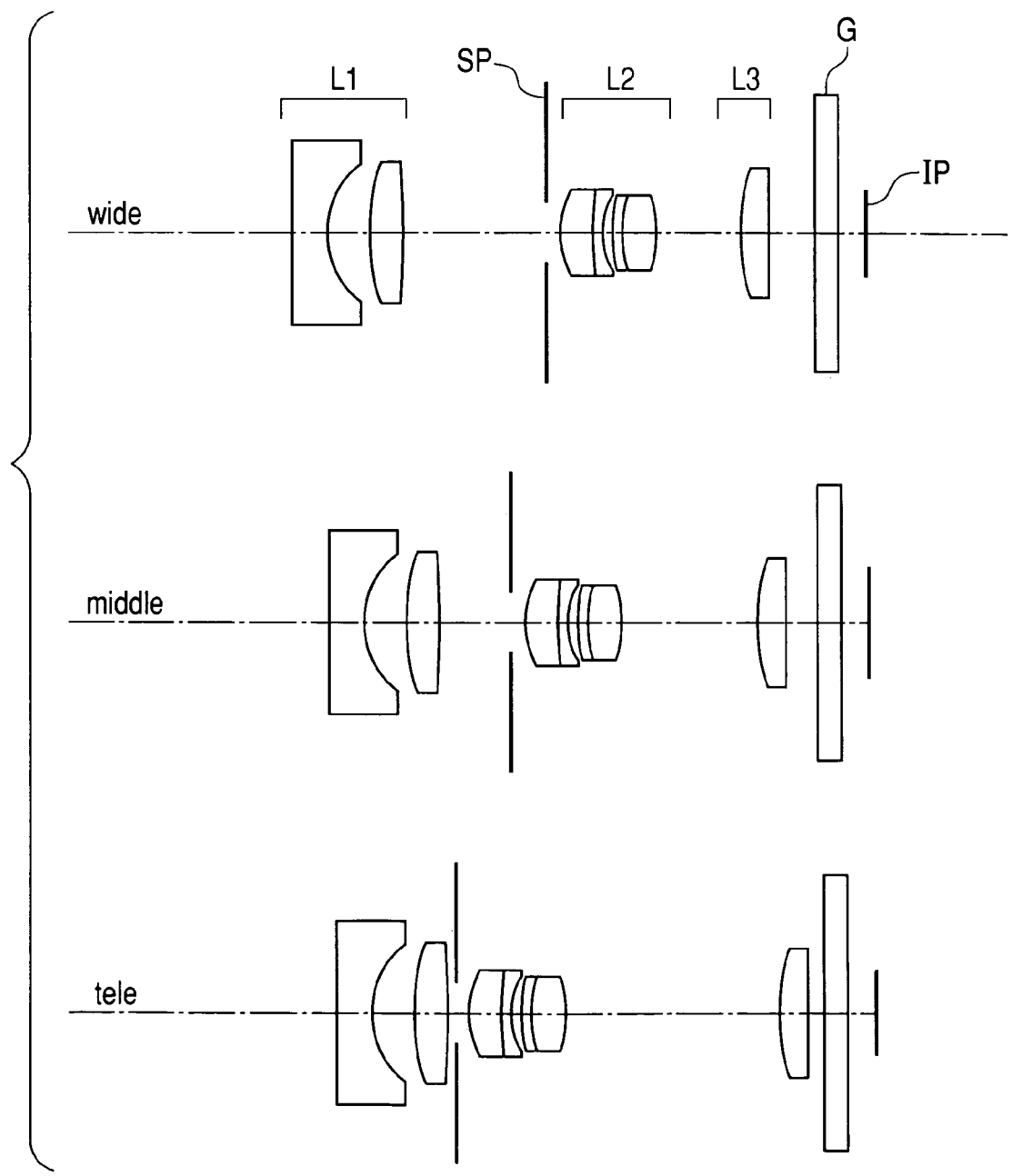
FIG. 3 is a lens sectional view showing a zoom lens according to Embodiment 2 of the present invention.
Figure 4A:
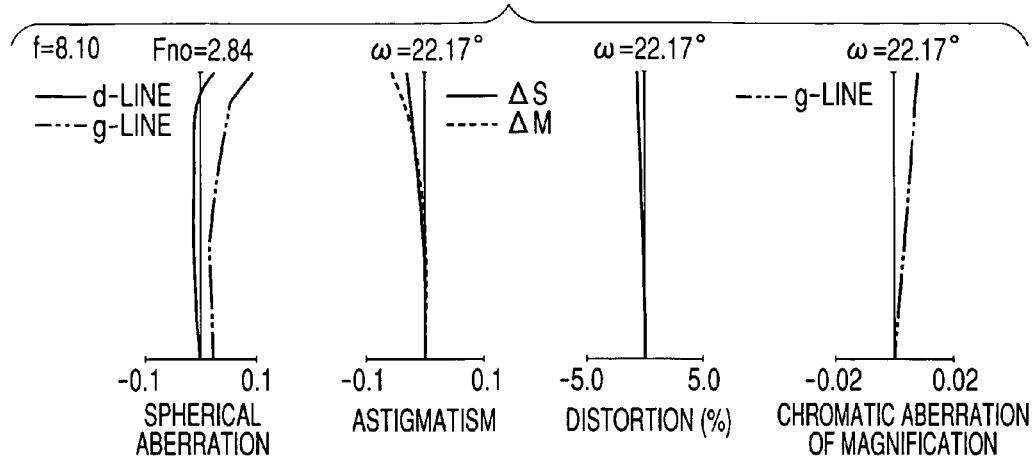
FIGS. 4A, 4B, and 4C are graphs showing various aberrations of the zoom lens according to Embodiment 2 of the present invention.
Figure 4B:
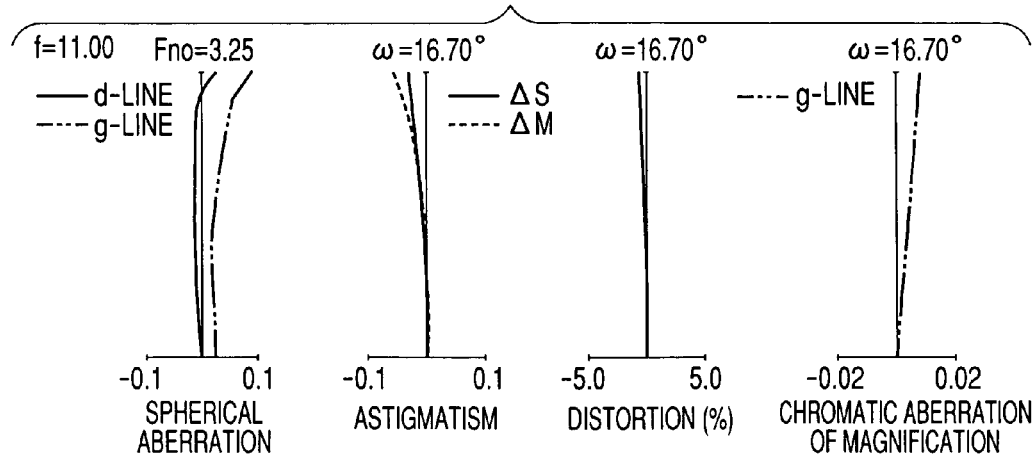
Figure 4C:
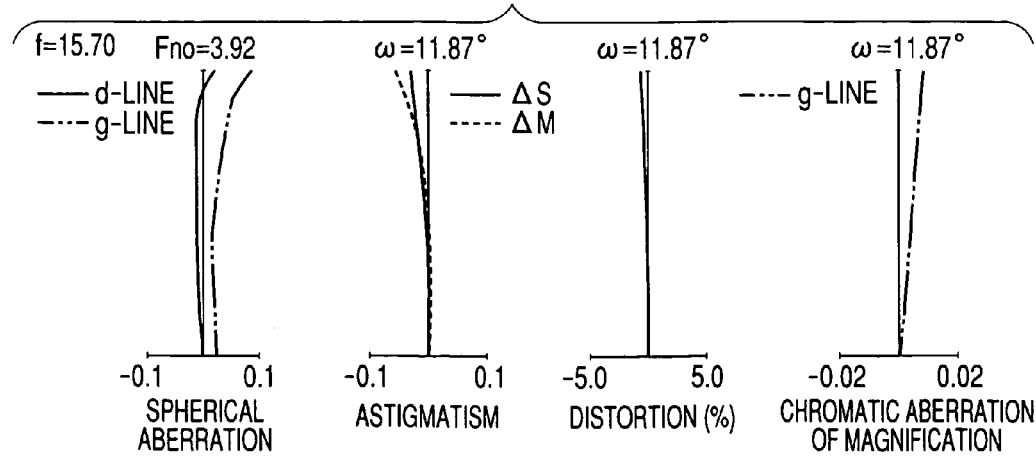
Figure 5:
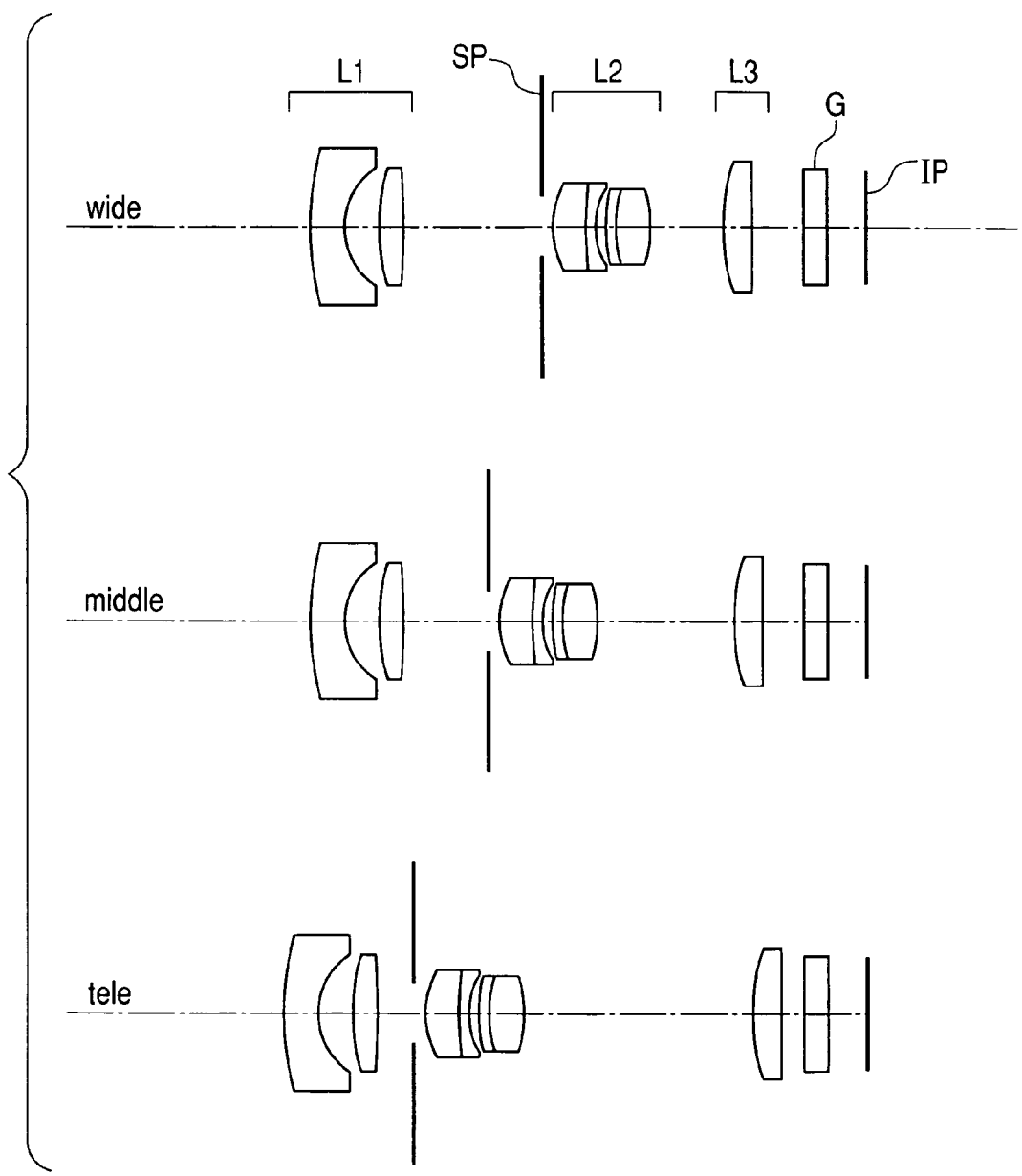
FIG. 5 is a lens sectional view showing a zoom lens according to Embodiment 3 of the present invention.
Figure 6A:
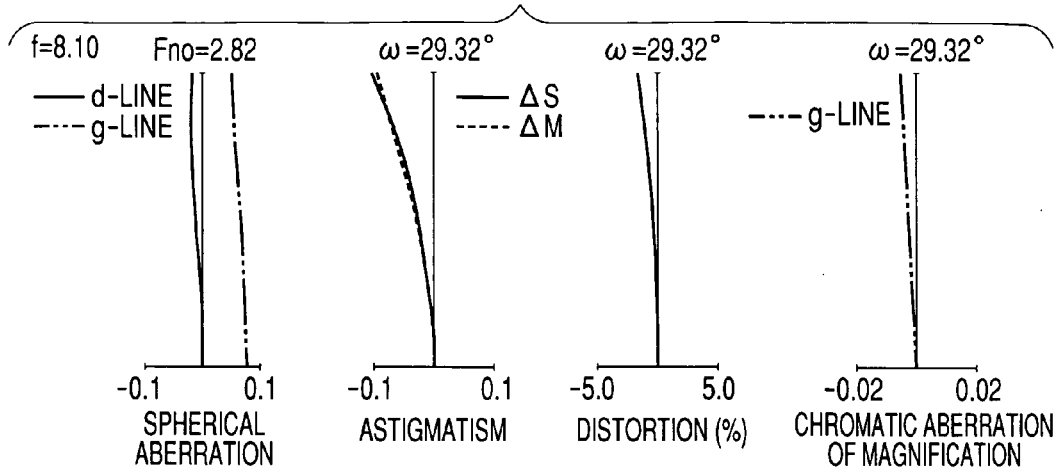
FIGS. 6A, 6B, and 6C are graphs showing various aberrations of the zoom lens according to Embodiment 3 of the present invention.
Figure 6B:
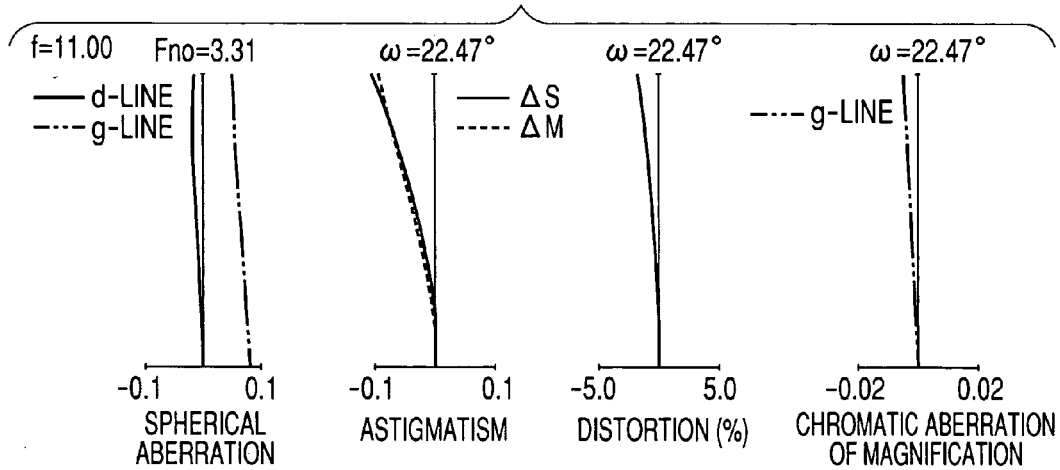
Figure 6C:
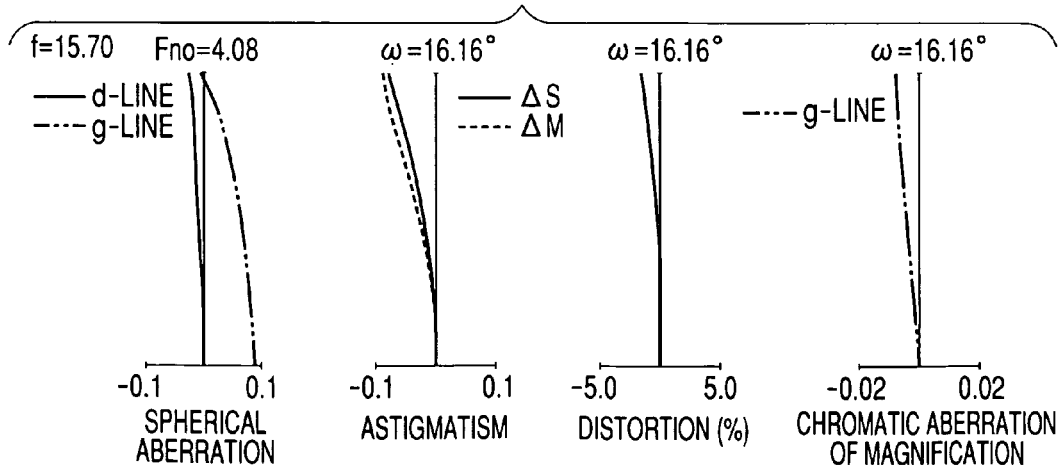

FIGS. 1, 3, and 5 are lens sectional views showing zoom lenses at zoom positions according to Embodiments 1 to 3 of the present invention. The zoom lens according to each of the embodiments is used for a photographing optical system for a video camera or a digital still camera. FIGS. 2A to 2C, 4A to 4C, and 6A to 6C are aberration graphs of the zoom lenses according to Embodiments 1 to 3. FIGS. 2A, 4A, and 6A show states of the respective zoom lenses at a wide-angle end. FIGS. 2B, 4B, and 6B show states of the respective zoom lenses at an intermediate zoom position. FIGS. 2C, 4C, and 6C show states of the respective zoom lenses at a telephoto end.

In the respective lens sectional views, the left is an object side (front) and the right is an image side (rear). Reference symbol L1 denotes a first lens unit having a negative refractive power (optical power=the reciprocal of a focal length), L2 denotes a second lens unit having a positive refractive power, and L3 denotes a third lens unit having a positive refractive power. Reference symbol SP denotes an aperture stop. Reference symbol G denotes a glass block designed corresponding to a parallel plate disposed on an optical path, such as an optical low pass filter, an infrared cut filter, or cover glass. Reference symbol IP denotes an image plane on which a photosensitive surface of a solid-state image pickup element (photoelectric transducer) such as a CCD sensor or a CMOS sensor is disposed.

In the respective aberration graphs, reference symbols d-LINE and g-LINE denote a d-line and a g-line, respectively. Reference symbols ΔM and ΔS denote a meridional image plane and a sagittal image plane, respectively. Chromatic aberration of magnification is shown with respect to the g-line.

In the zoom lens according to each of the embodiments, during zooming from the wide-angle end to the telephoto end, the first lens unit L1 moves toward the image side in a range between the wide-angle end and the intermediate zoom position, and moves toward the object side in a range between the intermediate zoom position and the telephoto end. That is, the first lens unit L1 moves along a portion of a locus convex to the image side. While an interval between the second lens unit L2 and the third lens unit L3 changes, the second lens unit L2 moves toward the object side and the third lens unit L3 moves toward the image side.

After zooming, an interval between the first lens unit L1 and the second lens unit L2 at the telephoto end becomes smaller than that at the wide-angle end. In addition, the interval between the second lens unit L2 and the third lens unit L3 at the telephoto end becomes larger than that at the wide-angle end.

The aperture stop SP is disposed between the first lens unit L1 and the second lens unit L2. The aperture stop SP moves together with the second lens unit L2 during zooming, thereby achieving the simplification of a mechanical structure.

The first lens unit L1 includes two lenses, that are, in order from the object side to the image side, a negative lens (first lens element) having a large curvature (small curvature radius) at the image side and a positive lens (second lens element) having a meniscus shape which is convex to the object side. An object side surface of the positive lens in the first lens unit L1 is an aspherical surface. Therefore, when the spherical lens is used for the negative lens composing the first lens unit, low cost manufacturing is possible. In addition, when the aspherical lens is used for the positive lens, preferable optical performance is realized even with a lower manufacturing cost of the aspherical lens than that of the negative lens.

The second lens unit L2 includes, in order from the object side to the image side, a positive lens (third lens element), a negative lens (fourth lens element), a negative lens (fifth lens element), and a positive lens (sixth lens element). The third lens element and the fourth lens element configure a cemented lens, and the fifth lens element and the sixth lens element configure another cemented lens.

Such a structure of the second lens unit L2 is developmentally derived from the lens structure of a so-called triplet type. That is, when a triplet type includes three lenses (positive lens, negative lens, and positive lens), the negative lens disposed in the center of the triplet type is divided into two elements. When the negative lens is divided to increase the number of surfaces of negative lens elements, it is possible to increase the degree of freedom for aberration correction as compared with that in the triplet type. As a result, the off-axis flare of a normal triplet type which is corrected by increasing a glass thickness of the negative lens can be preferably corrected with the suppression of thicknesses of the two negative lens elements. By cementing the object side surface of the object side negative lens element of the two negative lens elements to the positive lens located on the object side and cementing the image side surface of the image side of the other negative lens element to the positive lens located on the image side, it is also unnecessary to correct spherical aberration caused by two negative air lenses provided in front and rear of the negative lens. As a result, as compared with the case where the triplet type is used for the second lens unit, an optical axial thickness of the second lens unit can be reduced with maintaining preferable optical performance. Thus, a compact zoom lens in which the entire optical length is shortened can be realized. Note that the second lens unit L2 is disposed on the image side immediately after the first lens unit L1 having the negative refractive power. Therefore, aberration correction effects are caused by that a passing height of a marginal axial ray is high.

When the second lens unit L2 which is disposed immediately after the first lens unit L1 having the negative refractive power is composed of the triplet type, the eccentric sensitivity (sensitivity to image plane tilt) of each of the lens elements composing the second lens unit is high. Therefore, when high precision assembly is not performed for manufacturing, it is hard to maintain designed optical performance. In particular, with respect to the two positive lenses and the single negative lens which compose the triplet type, the eccentric sensitivity of the positive lens are opposite in sign to that of the negative lens (when the positive lens and the negative lens are parallel decentered in the same direction, directions in which image planes are tilted are reversed to each other). Thus, when the positive lens and the negative lens are parallel decentered in the reverse direction, image plane tilt directions caused by both parallel decenterings becomes the same direction, so the optical performance significantly deteriorates. In other words, when the triplet type is employed for the second lens unit, the high precision assembly and the adjustment after assembly are required, so there is a problem in that an assembly cost increases.

As described in these embodiments, the second lens unit is composed of two cemented lenses, so it is useful to solve the problem. In other words, the positive lens and the negative lens, which have large eccentric sensitivities and opposite signs, are cemented to each other. Therefore, even when the positive lens and the negative lens are parallel decentered by a manufacturing error, those lenses are parallel decentered in the same direction in which respective image plane tilts are cancelled by each other. Thus, preferable optical performance is stably realized while suppressing an increase in assembly cost.

The third lens unit L3 includes a single positive lens element. The zoom lenses according to Embodiments 1 to 3 satisfy the following conditions, $$0.1 < r2/r3 < 0.35 \tag{1},$$

$$-2.0 < (r3+r4)/(r3-r4) < 0.5 \tag{2},$$

$$0.38 < d2/d1t < 0.55 \tag{3},$$

where r2 represents a curvature radius of an image side surface of the negative lens in the first lens unit L1, r3 represents a curvature radius of an object side surface of the positive lens in the first lens unit L1, r4 represents a curvature radius of an image side surface of the positive lens in the first lens unit L1, d2 represents an interval between the positive lens and the negative lens in the first lens unit L1, and d1t represents an optical axial thickness of the first lens unit L1 (optical axial interval between a surface closest to the object side and a surface closest to the image side).

The conditional expression (1) relates to a ratio between the curvature radius of the image side surface of the negative lens composing the first lens unit L1 and the curvature radius of the object side surface of the positive lens composing thefirst lens unit L1. When the curvature radius of the image side surface of the negative lens is so large that r2/r3 exceeds an upper limit value of the conditional expression (1), it is hard to correct coma on an image peripheral portion in a wide-angle range. On the other hand, when the curvatureradius of the image side surface of the negative lens is so small that r2/r3 becomes smaller than a lower limit value of the conditional expression (1), it is hard to process the negative lens.

The conditional expression (2) relates to a shape factor of the positive lens composing the first lens unit L1. When (r3+r4)/(r3−r4) exceeds an upper limit value of the conditional expression (2) or becomes smaller than a lower limit value thereof, it is hard to correct comatic flare on the image peripheral portion in a telephoto range.

The conditional expression (3) relates to the interval between the negative lens and the positive lens which compose the first lens unit L1. When the interval is so large that d2/d1t exceeds an upper limit value of the conditional expression (3), a diameter of the front lens (lens closest to the object side) increases to increase a size of the entire lens system. It is not preferable. On the other hand, when the interval is so small that d2/d1t becomes smaller than a lower limit value of the conditional expression (3), it is hard to correct the coma on the image peripheral portion in the wide-angle range.

When numeral ranges in the conditional expressions (1) to (3) satisfy the following ranges, the above-mentioned effects can be further improved.

$$0.13 < r2/r3 < 0.30 \quad (1a)$$

$$-1.7 < (r3+r4)/(r3-r4) < 0 \quad (2a)$$

$$0.4 < d2/d1t < 0.45 \quad (3a)$$

Next, numerical data in Numerical Embodiments 1 to 3 corresponding to Embodiments 1 to 3 will be shown. In the numerical embodiments, f denotes a focal length, Fno denotes an F number, and ω denotes a half field angle. In addition, "i" denotes an order counted from the object side, Ri denotes a curvature radius of an i-th surface, Di denotes an axial interval between the i-th surface and the (i+1)-th surface. Further, Ni denotes a refractive index of a material between the i-th surface and the (i+1)-th surface with respect to a d-line and νi denotes an Abbe number of the material with respect to a d-line.

An aspherical shape is expressed by the following expression, $$X = \frac{(1/R)h^2}{1 + \sqrt{\{1-(1+k)(h/R)^2\}}} + Ah^2 + Bh^4 + Ch^6 + Dh^8 + Eh^{10}$$

where, with an assumption that a light traveling direction being positive, x represents a displacement amount from a surface vertex in the optical axis direction, h represents a height from the optical axis in a direction perpendicular to the optical axis, R represents a paraxial radius of curvature, k represents a conic constant, and B, C, D, and E represent aspherical coefficients. Note that "e±Z" indicates "×10^{±Z}".

Table 1 shows relationships between the conditional expressions (1) to (3) and the numeral embodiments.

NUMERAL EMBODIMENT 1 f=8.10~15.70 Fno=3.60~4.12 2ω=58.6~32.3

| R1 = 31.177 | D1 = 2.50 | N1 = 1.772499 | ν1 = 49.6 |
| R2 = 6.249 | D2 = 3.03 | | |
| * R3 = 22.106 | D3 = 1.94 | N2 = 1.846660 | ν2 = 23.8 |
| R4 = 101.144 | D4 = Variable | | |
| R5 = Stop | D5 = 1.03 | | |
| * R6 = 6.361 | D6 = 2.79 | N3 = 1.730770 | ν3 = 40.5 |
| R7 = 58.020 | D7 = 0.73 | N4 = 1.698947 | ν4 = 30.1 |
| R8 = 5.840 | D8 = 0.87 | | |
| R9 = 20.744 | D9 = 0.73 | N5 = 1.846660 | ν5 = 23.8 |
| R10 = 8.821 | D10 = 2.65 | N6 = 1.696797 | ν6 = 55.5 |
| R11 = −16.616 | D11 = Variable | | |
| R12 = 20.287 | D12 = 2.21 | N7 = 1.517417 | ν7 = 52.4 |
| R13 = −2587.247 | D13 = Variable | | |
| R14 = ∞ | D14 = 2.00 | N8 = 1.516330 | ν8 = 64.1 |
| R15 = ∞ | | | |

| Variable | Focal length | | |
| --- | --- | --- | --- |
| interval | 8.10 | 11.00 | 15.70 |
| D4 | 13.31 | 7.64 | 3.00 |
| D11 | 5.00 | 9.25 | 15.98 |
| D13 | 4.28 | 3.58 | 2.20 |

Aspherical Coefficients
Third Surface

| k = 0.00000e+00 | A = 0 | B = 2.44934e−04 | C = −3.31138e−07 |
| D = 1.51612e−07 | E = −4.67258e−10 | | |

Sixth Surface

| k = −1.65377e+00 | A = 0 | B = 5.70807e−04 | C = 1.04001e−07 |
| D = 4.58874e−08 | E = 0.00000e+00 | | |

NUMERICAL EMBODIMENT 2 f=8.10~15.70 Fno=2.84~3.25 2ω=44.9~24.1

| | | | |
|---|---|---|---|
| R1 = −778.924 | D1 = 2.50 | N1 = 1.638539 | ν1 = 55.4 |
| R2 = 6.918 | D2 = 3.57 | | |
| * R3 = 50.577 | D3 = 2.50 | N2 = 1.846660 | ν2 = 23.8 |
| R4 = −74.470 | D4 = Variable | | |
| R5 = Stop | D5 = 1.03 | | |
| * R6 = 6.361 | D6 = 2.79 | N3 = 1.730770 | ν3 = 40.5 |
| R7 = 58.020 | D7 = 0.73 | N4 = 1.698947 | ν4 = 30.1 |
| R8 = 5.840 | D8 = 0.87 | | |
| R9 = 20.744 | D9 = 0.73 | N5 = 1.846660 | ν5 = 23.8 |
| R10 = 8.821 | D10 = 2.65 | N6 = 1.696797 | ν6 = 55.5 |
| R11 = −16.616 | D11 = Variable | | |
| * R12 = 20.287 | D12 = 2.21 | N7 = 1.589129 | ν7 = 61.3 |
| R13 = −2587.247 | D13 = Variable | | |
| R14 = ∞ | D14 = 2.00 | N8 = 1.516330 | ν8 = 64.1 |
| R15 = ∞ | | | |

| Variable | Focal length | | |
|---|---|---|---|
| interval | 8.10 | 11.00 | 15.70 |
| D4 | 11.58 | 5.64 | 0.65 |
| D11 | 7.15 | 11.31 | 17.45 |
| D13 | 3.47 | 2.59 | 1.20 |

Aspherical Coefficients

Third Surface

| | | | |
|---|---|---|---|
| K = 0.00000e+00 | A = 0 | B = 1.75060e−04 | C = 2.03087e−06 |
| D = −3.81094−08 | E = 1.65002e−09 | | |

Sixth Surface

| | | | |
|---|---|---|---|
| K = −1.65377e+00 | A = 0 | B = 5.70807e−04 | C = 1.04001e−07 |
| D = 4.58874e−08 | E = 0.00000e+00 | | |

| | | | |
|---|---|---|---|
| K = 0.00000e+00 | A = 0 | B = −2.43560e−05 | C = −2.26966e−08 |
| D = 4.72288e−09 | E = −3.66244e−11 | | |

NUMERICAL EMBODIMENT 3 f=8.10~15.70 Fno=2.82~3.31 2ω=58.6~32.3

| | | | |
|---|---|---|---|
| R1 = 28.426 | D1 = 2.50 | N1 = 1.712995 | ν1 = 53.9 |
| R2 = 5.374 | D2 = 2.97 | | |
| * R3 = 25.820 | D3 = 1.70 | N2 = 1.846660 | ν2 = 23.8 |
| R4 = 337.253 | D4 = Variable | | |
| R5 = Stop | D5 = 1.30 | | |
| * R6 = 6.361 | D6 = 2.79 | N3 = 1.730770 | ν3 = 40.5 |
| R7 = 58.020 | D7 = 0.73 | N4 = 1.698947 | ν4 = 30.1 |
| R8 = 5.840 | D8 = 0.87 | | |
| R9 = 20.744 | D9 = 0.73 | N5 = 1.846660 | ν5 = 23.8 |
| R10 = 8.821 | D10 = 2.65 | N6 = 1.696797 | ν6 = 55.5 |
| R11 = −16.616 | D11 = Variable | | |
| R12 = 20.287 | D12 = 2.21 | N7 = 1.644757 | ν7 = 57.8 |
| R13 = −2587.247 | D13 = Variable | | |
| R14 = ∞ | D14 = 2.00 | N8 = 1.516330 | ν7 = 64.1 |
| R15 = ∞ | | | |

| Variable | Focal length | | |
|---|---|---|---|
| interval | 8.10 | 11.00 | 15.70 |
| D4 | 11.24 | 6.86 | 3.00 |
| D11 | 6.06 | 11.36 | 18.68 |
| D13 | 4.23 | 3.29 | 2.20 |

Aspherical Coefficients

Third Surface

| | | | |
|---|---|---|---|
| k = 0.00000e+00 | A = 0 | B = 3.52168e−04 | C = 2.27503e−06 |
| D = 1.69721e−07 | E = 4.03257e−09 | | |

Sixth Surface

| | | | |
|---|---|---|---|
| k = −1.65377e+00 | A = 0 | B = 5.70807e−04 | C = 1.04001e−07 |
| D = 4.58874e−08 | E = 0.00000e+00 | | |

TABLE 1

| | Conditional expression (1) | Conditional expression (2) | Conditional expression (3) |
|---|---|---|---|
| Embodiment 1 | 0.28 | −1.56 | 0.41 |
| Embodiment 2 | 0.14 | −0.19 | 0.42 |
| Embodiment 3 | 0.21 | −1.17 | 0.41 |

As described above, the lens structures of the respective lens units, aspherical surface disposition, the method of moving the lenses during zooming, and the like are suitably set, so the number of lenses is reduced to shorten the entire lens length. In addition, it is possible to realize an optical system which maintains a zoom ratio of about 2, has extremely high optical performance, is manufactured in low cost, and is suitable to use in a digital still camera.

Next, an example of an optical device using the zoom lens according to any one of Embodiments 1 to 3 as a photographing optical system will be described with reference to FIG. 7.

Figure 7:
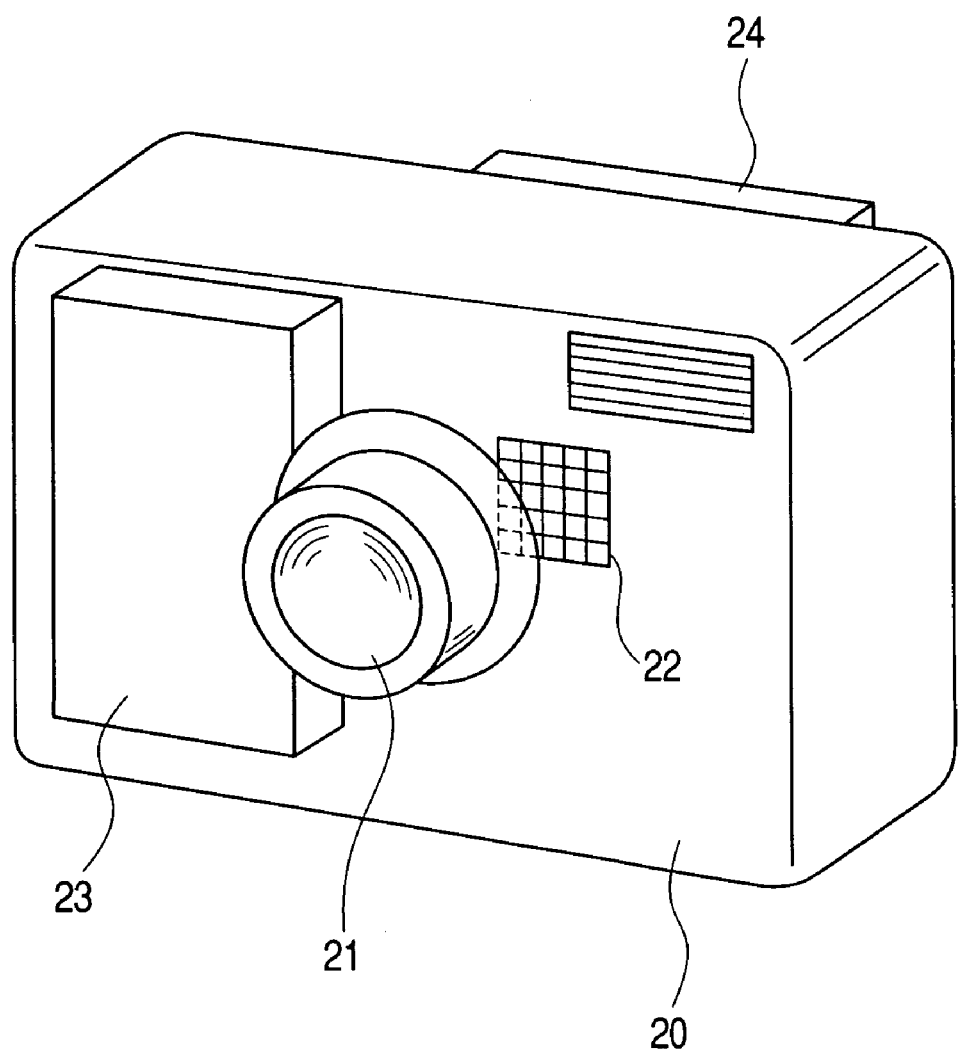
FIG. 7 is a main part schematic view showing a digital still camera.

FIG. 7 shows an example in which the zoom lens system of the present invention is used for a digital still camera. In FIG. 7, the digital still camera includes a camera main body 20, a photographing optical system 21, a solid-state image pickup element (photoelectric transducer) 22 such as a CCD sensor or a CMOS sensor, a memory 23, and a finder 24. The photographing optical system 21 is composed of the zoom lens described in any one of Embodiments 1 to 3. The solid-state image pickup element 22 is incorporated in the camera main body 20 and receives a subject image formed by the photographing optical system 21. The memory 23 stores information corresponding to the subject image, which is photoelectrically converted by the solid-state image pickup element 22. The finder 24 is composed of a liquid crystal display panel and the like and used for observing the subject image formed on the solid image pickup element 22.

As described above, the zoom lens system of the present invention is applied to an image pickup apparatus such as a video camera or a digital still camera. Therefore, it is possible to realize an image pickup apparatus which is small in size and has high optical performance.

This application claims priority from Japanese Patent Application No. 2004-178533 filed Jun. 16, 2004, which is hereby incorporated by reference herein.

What is claimed is:

1. A zoom lens system, comprising, in order from an object side to an image side:
   a first lens unit having negative optical power, the first lens unit consisting of a first lens element having negative optical power and a second lens element having positive optical power, the second lens element being an aspherical lens;
   a second lens unit having positive optical power; and
   a third lens unit having positive optical power,
   wherein during zooming from a wide-angle end to a telephoto end, an interval between the first lens unit and the second lens unit reduces and an interval between the second lens unit and the third lens unit changes, and
   wherein the following conditions are satisfied, $0.1 < r2/r3 < 0.35$, $-2.0 < (r3+r4)/(r3-r4) < 0.5$, $0.38 < d2/d1t < 0.55$, where r2 represents a curvature radius of an image side surface of the first lens element, r3 represents a curvature radius of an object side surface of the second lens element, r4 represents a curvature radius of an image side surface of the second lens element, d2 represents an axial interval between the first lens element and the second lens element, and d1t represents an optical axial thickness of the first lens unit.

2. A zoom lens system according to claim 1, wherein the object side surface of the second lens element is of a convex shape and is an aspherical surface.

3. A zoom lens system according to claim 1, further comprising
   an aperture stop disposed on an object side of the second lens unit
   wherein the aperture stop moves together with the second lens unit during zooming.

4. A zoom lens system according to claim 1, wherein the first lens element comprises a spherical lens.

5. A zoom lens system according to claim 1, wherein the third lens unit consists of a single spherical lens having positive optical power in which an object side surface of the single spherical lens is of a convex shape.

6. A zoom lens system according to claim 1, wherein the zoom lens system forms an image on a photoelectric transducer.

7. A zoom lens system, comprising, in order from the object side to the image side:
- a first lens unit having negative optical power, the first lens unit consisting of a first lens element having negative optical power and a second lens element having positive optical power, the second lens element being an aspherical lens;
- a second lens unit having positive optical power, the second lens unit consisting, in order from the object side to the image side, of a third lens element having positive optical power, a fourth lens element having negative optical power, a fifth lens element having negative optical power, and a sixth lens element having positive optical power, the third lens element and the fourth lens element constituting a cemented lens, the fifth lens element and the sixth lens element constituting a cemented lens; and
- a third lens unit having positive optical power,
- wherein during zooming from a wide-angle end to a telephoto end, an interval between the first lens unit and the second lens unit reduces and an interval between the second lens unit and the third lens unit changes.

8. A zoom lens system according to claim 7, wherein the object side surface of the second lens element is of a convex shape and is an aspherical surface.

9. A zoom lens system according to claim 7, further comprising
- an aperture stop disposed on an object side of the second lens unit
- wherein the aperture stop moves together with the second lens unit during zooming.

10. A zoom lens system according to claim 7, wherein the first lens element comprises a spherical lens.

11. A zoom lens system according to claim 7, wherein the third lens unit consists of a single spherical lens having positive optical power in which an object side surface of the single spherical lens is of a convex shape.

12. A zoom lens system according to claim 7, wherein the zoom lens system forms an image on a photoelectric transducer.

13. An image pickup apparatus comprising:
the zoom lens system according to claim 1; and
a photoelectric transducer for receiving the image formed by the zoom lens system.

14. An image pickup apparatus comprising:
the zoom lens system according to claim 7;
and a photoelectric transducer for receiving the image formed by the zoom lens system.

* * * * *